(12) United States Patent
Hong et al.

(10) Patent No.: US 6,824,913 B2
(45) Date of Patent: Nov. 30, 2004

(54) ANODE FOR MOLTEN CARBONATE FUEL CELL COATED WITH POROUS CERAMIC FILMS

(75) Inventors: Seong-Ahn Hong, Seoul (KR); In-Hwan Oh, Seoul (KR); Tae-Hoon Lim, Seoul (KR); Suk-Woo Nam, Seoul (KR); Heung-Yong Ha, Seoul (KR); Sung Pil Yoon, Seoul (KR); Jonghee Han, Seoul (KR); Beom Seok Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 293 days.

(21) Appl. No.: 10/096,910

(22) Filed: Mar. 14, 2002

(65) Prior Publication Data

US 2003/0096155 A1 May 22, 2003

(30) Foreign Application Priority Data

Nov. 1, 2001 (KR) ........................................ 2001-67917

(51) Int. Cl.$^7$ ........................... H01M 4/86; H01M 4/90
(52) U.S. Cl. ........................................... 429/41; 429/44
(58) Field of Search ............................. 429/41, 44, 209

(56) References Cited

U.S. PATENT DOCUMENTS

| | | | |
|---|---|---|---|
| 3,464,861 A | * | 9/1969 | Williams et al. ............... 429/30 |
| 4,247,604 A | | 1/1981 | Marianowski et al. |
| 4,548,877 A | | 10/1985 | Iacovangelo et al. |
| 4,596,751 A | | 6/1986 | Kunz et al. |
| 4,643,954 A | | 2/1987 | Smith |
| 5,629,103 A | * | 5/1997 | Wersing et al. ............... 429/33 |

FOREIGN PATENT DOCUMENTS

| DE | 3935311 A | * | 4/1991 | ............ C04B/35/58 |
|---|---|---|---|---|
| JP | 63184265 A | * | 7/1988 | ............ H01M/8/02 |
| JP | 04357672 A | * | 12/1992 | ............ H01M/4/88 |
| WO | WO 00/39358 A | * | 7/2000 | ............ C23C/26/00 |

* cited by examiner

Primary Examiner—Gregg Cantelmo
(74) Attorney, Agent, or Firm—Browdy and Neimark, P.L.L.C.

(57) ABSTRACT

The present invention provides an anode for a Molten Carbonate Fuel Cell (MCFC) and a MCFC including the same, particularly an anode for the MCFC coated by a porous ceramic film, when the invention is used, the wettability of the anode to the molten carbonate used as the electrolyte for the MCFC and the amount of impregnated electrolyte will be greatly improved, and thus is very useful in viewpoint that it can prevent any electrolyte loss that is often observed in the long periods of operation of the MCFC, and maintain a high stability of the cell for an extended period of time, compared with the conventional cell. Also, the present invention itself is applicable to an electrode made of Ni-based alloys or metal compounds, which is expected to be competent MCFC materials nowadays, as well as the electrode made of Ni, Ni—Cr and Ni—Al alloy used in the present invention.

9 Claims, 9 Drawing Sheets (a)    (b)

(a)

(b)

(c)

(d)

(a)

(b)

(c)

(d)

(e)

(f)

ANODE FOR MOLTEN CARBONATE FUEL CELL COATED WITH POROUS CERAMIC FILMS

BACKGROUND OF THE INVENTION

1. Field of the Invention

The present invention relates to an anode for molten carbonate fuel cell and a molten carbonate fuel cell (hereinafter, it is referred to as MCFC) containing the same. In particular, the present invention relates to an anode for MCFC and a MCFC containing the same to maintain stably excellent cell performances during a long drive by preventing electrolyte loss by improving wettability of the MCFC against the electrolyte, which is accomplished by coating the internal surface of the anode pore with a porous ceramic film.

2. Description of the Related Art

A preferable material of an anode for MCFC should satisfy high conductivity, excellent catalytic activity for oxidation of hydrogen ($H_2$), high porosity, improved resistivity (stability) against sintering and creep, proper wettability against molten carbonate, and finally low price. However, when MCFC is operated during an extended period of time, the molten carbonate of electrolyte is always gradually lost due to evaporation of the electrolyte or corrosion of the dividing plate. In consequence, the amount of impregnated electrolyte of matrix decreases, causing cross-over between the fuel and the oxidizer, and the stability of MCFC performances during an extended period of time is much difficult to obtain.

In order to solve the problems described above, a number of attempts have been made. One method incorporates a large amount of electrolyte in anticipation of a lot of consumption of the molten carbonate of electrolyte of the MCFC. However, if too much electrolyte is supplied, it first flows into a cathode that has a relatively good wettability to an anode, and consequently deteriorates the cell's performances, causing a flooding phenomenon. To prevent the flooding occurrence, the anode should have very small pores that trigger capillary pressure difference in the cell, which in turn increases the amount of the impregnated electrolyte in the anode, or the wettability against the electrolyte of the anode should be greatly improved. However, when the pores of the anode are considerably small, diffusion resistance of a reactant gas occurs, and the electrodes are severely polarized thereby, and in result, the ability of the cell is weakened. In addition, considering that different materials have their own wettability, the wettability of the material is improved only when the surface of the material is comprehensively modified. Unless the surface is modified, the anode material or the electrolytic material should be changed instead. However, a method for improving the wettability of the anode without changing the anode material or the electrolytic material itself is needed. In view of the foregoing, the MCFC anode having high porosity and excellent wettability against the electrolyte even in case of using a conventional anode material and the electrolytic material at a constant pore size should be developed.

Other methods for improving MCFC's performances have been continuously suggested. In the early stage of the MCFC development, for example, Ag or Pt was the typical anode material. However, in consideration of conductivity, catalytic activity and cost, Ni or an alloy of Ni and Cr is being widely used now. Frequently used methods in the art for improving MCFC performances include a method of electroless plating the oxide by Ni or Cu, a method of adding an oxide like $LiAlO_2$ or $Al_2O_3$ to Ni, a method of solution impregnation to form an oxide in a final stage of the operation by impregnating a salt solution, and a method of using an Ni-based alloy, such as, Ni—Cr or Ni—Al. Despite of many trials, the methods aforementioned could not achieve significant improvement on the wettability of the anode against the electrolyte, because in a way, they are only for improving sintering and creep resistance of the anode, sporadically forming little oxide particles on the anode.

In addition, Kunz et al (U.S. Pat. No. 4,596,751) discloses a method of changing the amount of the impregnated electrolyte by differentiating the sizes of pores of a cathode, a matrix and an anode. However, the method should be applied with caution in that the size control of pores of each cell component is directly related to the porosity and the cell performance with each other. Accordingly, the method is again insufficient for significantly increasing the amount of the impregnated electrolyte.

Although many attempts have been made to increase the amount of the impregnated electrolyte for the MCFC anode, the results are not very satisfactory in terms of improving the impregnation of electrolyte. Therefore, it is necessary to develop a method for increasing the amount of the impregnated electrolyte with an easy control over microstructure and simplified process without using expensive reactant or equipment.

SUMMARY OF THE INVENTION

It is, therefore, an object of the present invention to provide an anode for a molten carbonate fuel cell (MCFC) with improved wettability and an amount of impregnated electrolyte, so that a cathode of the cell is not flooded due to oversupplied electrolyte, and electrolyte loss and deterioration of cell's performance due to evaporation and corrosion of the molten carbonate during long periods of operation of MCFC are successfully prevented.

Another object of the present invention is to provide an anode for the MCFC to prevent gas diffusion resistance of the anode by maintaining microstructures without changing the size of pores of the anode, so that the MCFC can be operated for an extended period of time, yet maintaining a good stability without any electrolyte loss.

To achieve the above object, there is provided an anode for a MCFC including an anode, electrolyte and a cathode, wherein the anode has pore's surfaces coated by a porous ceramic film.

The anode material for the MCFC is selected from a group consisting of pure Ni, metallic mixtures containing Ni, alloys containing Ni, and metallic compounds containing Ni.

Preferably, the porous ceramic film for coating the anode for the MCFC is selected from a group consisting of aluminum oxide sol, cerium oxide sol, zirconium oxide sol, aluminum hydroxide sol, cerium hydroxide sol and zirconium hydroxide sol.

At this time, the porous ceramic film of the MCFC anode is formed through a sol-gel process, which dips the anode into a ceramic sol, and then dries.

The coating process usually takes less than 1 minute.

Also, the coating process of the anode for the MCFC is repeated more than once.

Preferably, in the present invention, the coating process of the anode for the MCFC is repeated twice.

Preferably, the amount of the coating is in a range of from 4 to 5% by weight based on the total weight of the anode.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
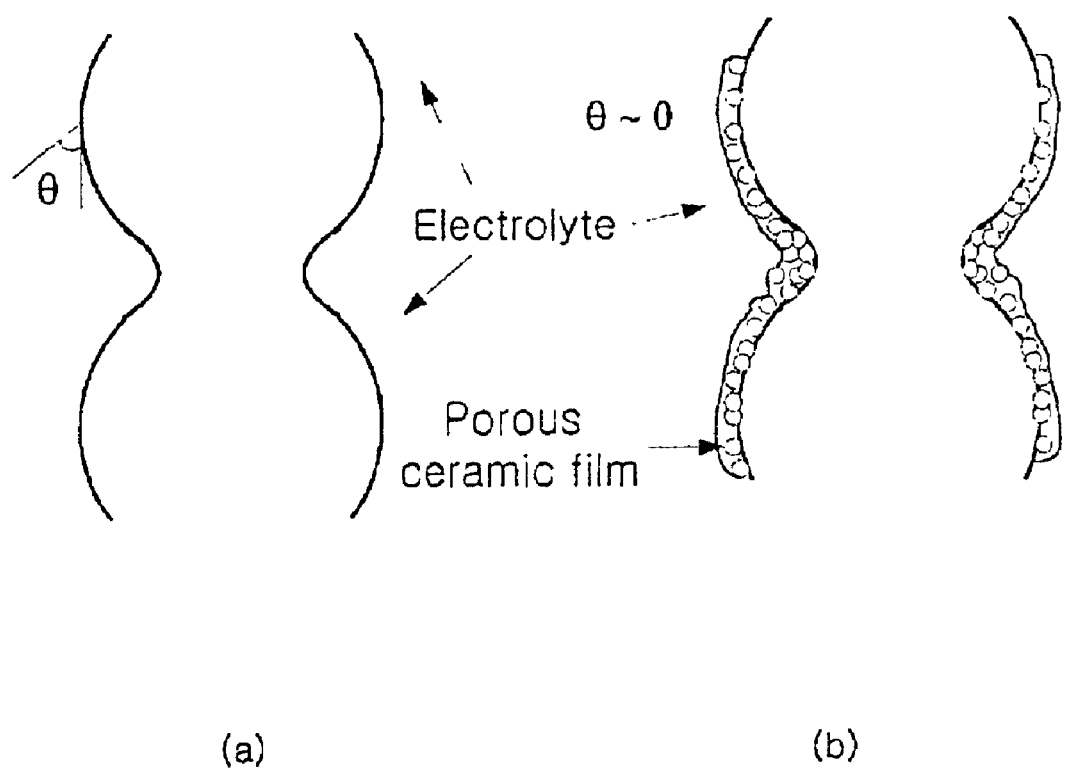
FIG. 1 is a schematic diagram illustrating the mechanism of wettability improvement of an anode coated by a film of porous ceramic.

Hereinafter, more detailed description for the present invention is provided.

In the anode for the MCFC according to the present invention, a porous ceramic film coats the internal surface of pores of the anode for the MCFC. Here, the anode is formed from the nickel being manufactured through tape casting process or by adding 10% by weight of chromium powder based on the total weight of the anode(hereinafter, it is referred to as Ni—Cr). Also, the alloy of nickel and 5% by weight of aluminum based on the weight of nickel (hereinafter, it is referred to as Ni—Al) was used for the anode for the MCFC. $Al_2O_3$ sol or $CeO_2$ sol was used as materials for the porous ceramic film.

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

EXAMPLE 1

Figure 2:
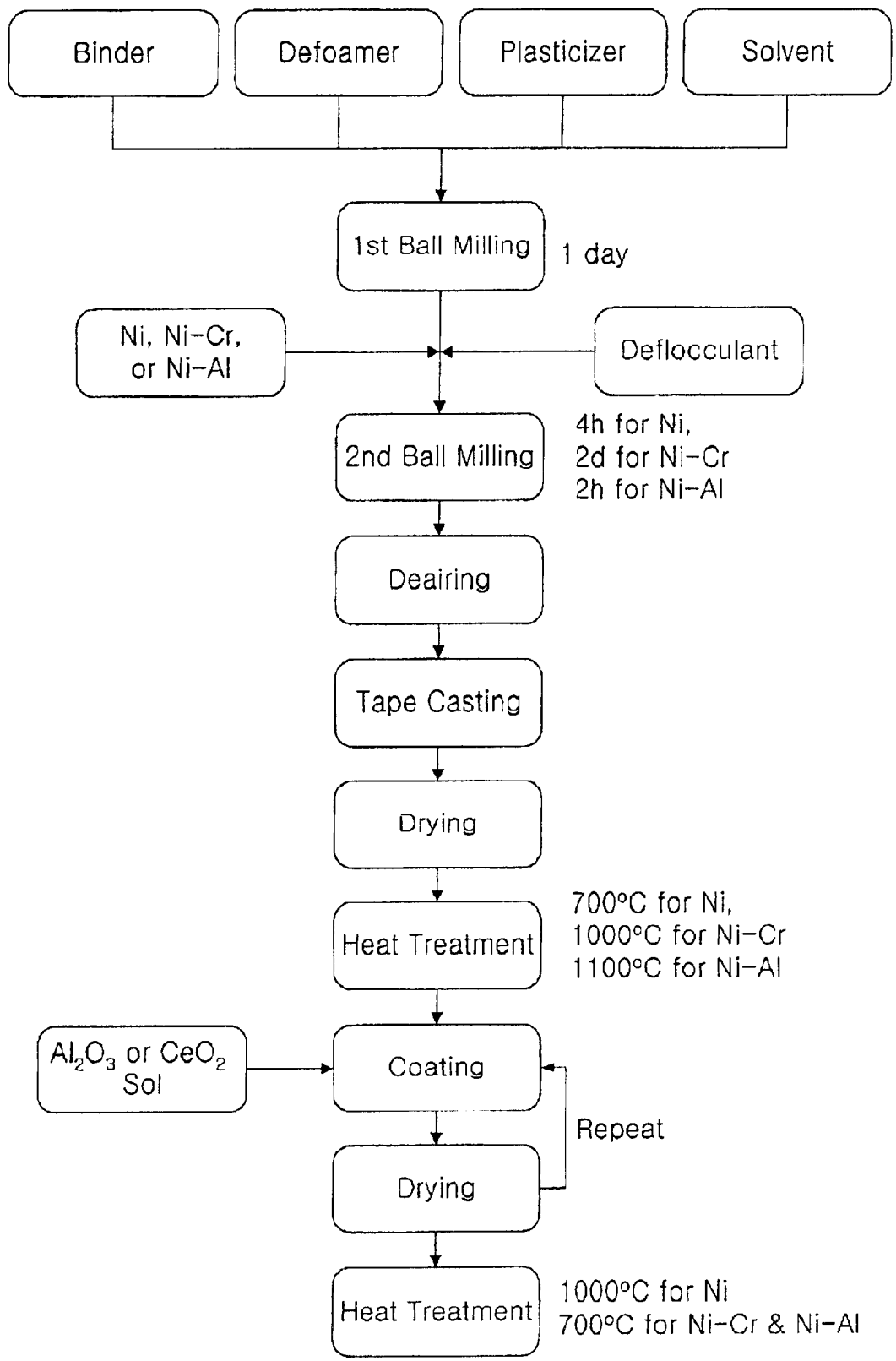
FIG. 2 is the whole process chart illustrating a manufacturing process of an anode coated by a ceramic sol.

Following the process illustrated in FIG. 2, a Ni electrode and $Al_2O_3$ sol were manufactured, and then the electrode was coated by the sol.

1. Manufacture of Electrode

A binder (Methyl Cellulose #1,500, available from Junsei Chemical Co., Japan), a plasticizer (Glycerol, available from Junsei Chemical Co., Japan), and a defoamer (SN-154, manufactured by San Nopco Korea) were dissolved in water, and a ball milling process was carried out for one day. Then, Ni powder(INCO #255, having a particle size of 3 $\mu$m) and a deflocculant (Cerasperse-5468, manufactured by San Nopco Korea) were additionally added and the ball milling process again for 4 hours was carried out to manufacture a slurry for the Ni anode. After defoaming the slurry, tape casting the slurry at a thickness of 1.6 to 1.7 mm, and drying at room temperature, an anode green sheet was prepared. The dried green sheet was heated at a temperature of 700° C. under reduction atmosphere in order for the slurry to have a suitable strength, porosity and size of pores for the ceramic sol coating process. In result, the Ni electrode with the size of the pore of about 8 to about 10 $\mu$m, the porosity of about 78 to about 82%, and the thickness of about 0.65 to 0.70 mm was obtained.

2. Manufacture of Sol for Coating

The water-based sol, $Al_2O_3$ for coating(Alfa AESAR, USA) was prepared by mixing the sol having the concentration of 20% by weight and the particle size of 50nm with 30% by weight of ethyl alcohol based on the total weight of the sol. In result, $Al_2O_3$ sol with a fixed final concentration of 14% by weight based on the coating sol was prepared. Particularly, ethyl alcohol was added to the sol in a way for improving the wettability of the sol against metals since the sol was first dissolved in water.

3. Carrying out Coating Process

The coating was accomplished through a dipcoating method. The dipcoating method indicates a method of dipping an electrode into a sol completely, and after a certain amount of time, taking the electrode out of the sol and drying the electrode. In the present invention, the electrode was completely dipped into the sol manufactured according to the above method, after 10 seconds, 1 minute, 30 minutes, 150 minutes, 300 minutes and 1500 minutes, respectively, from the dipping, the electrode was dried at room temperature for one hour, and at a temperature of 100° C. for one hour.

In result, an alumina gel with approximately 35% of porosity and approximately 110 $cm^2/g$ of specific-surface area.

EXAMPLE 2

A Ni—Cr electrode was manufactured by adding Cr to Ni in accordance with the method illustrated in FIG. 2, and the electrode was coated by $Al_2O_3$ sol(Alfa AESAR, USA, having a particle size of 50 nm) or $CeO_2$ sol(Alfa AESAR, USA, having a particle size of 10 to 20 nm).

1. Manufacture of Ni—Cr Electrode

Ni—Cr electrode was prepared through the procedure illustrated in the Example 1 except that Ni powder to which 10% by weight of Cr powder was added(CR-102, Atlantic Equipment Engineers, USA) was used instead of Ni, and the slurry of the Ni and Cr was heated at a temperature of 1000° C. In result, an anode having about 55 to 58% of porosity and 2 to 3 $\mu$m of the pore size was manufactured.

2. Preparation of Coating Sol $Al_2O_3$ sol(Alfa AESAR, USA, having a particle size of 50 nm) or $CeO_2$ sol(Alfa AESAR, USA, having a particle size of 10 to 20 nm) was purchased for the present invention.

3. Carrying out Coating Process

The same procedure illustrated in the EXAMPLE 1 was repeated.

EXAMPLE 3

In Example 3, an alloy powder of Ni—Al was used instead of using the slurry of Cr powder and Ni powder of the Example 2 in the manufacture of an anode, taking advantage of excellent sintering and creep resistance of the Ni—Al alloy in spite of long periods of high-temperature operation. Also, $Al_2O_3$ sol was used for the coating sol.

1. Preparation of Ni—Al Electrode

An alloy powder of Ni— 5 wt. % Al having an average particle size of 5 μm, available from Nippon Atomizing Co., Japan, was purchased for the present invention. The same procedure illustrated in EXAMPLE 2 was repeated except that a single-powder was used.

2. Preparation of Coating Sol $Al_2O_3$ sol(Alfa AESAR, USA, having a particle size of 50 nm) was purchased for the present invention.

3. Carrying out Coating Process

The same procedure illustrated in EXAMPLE 2 was repeated.

The following experiments were conducted in order to find out more desirable or suitable coating conditions for the present invention.

EXPERIMENTAL EXAMPLE 1

Determination of Suitable Coating Time

Figure 3:
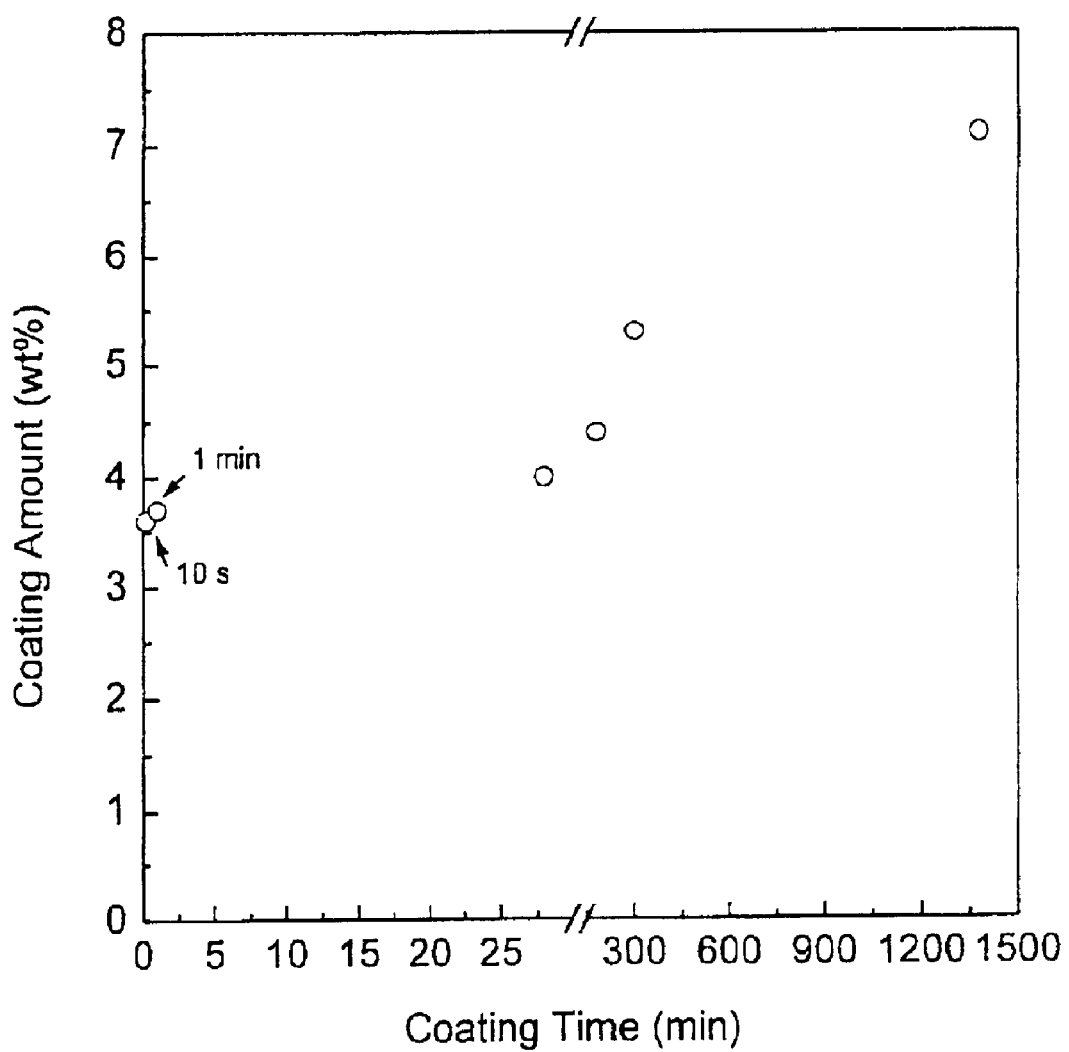
FIG. 3 is a graph illustrating changes of an amount of coating relative to coating time.

The inventors measured the coating amounts during different coating times, such as, 10 sec, 1 min, 30 min, 150 min, 300 min and 1500 min, to get an amount of coating according to the coating time of the anode for the MCFC, using the MCFC anodes manufactured by the EXAMPLE 1. The results are manifested in FIG. 3. As shown in FIG. 3, as the coating time increases from 10 sec to 1500 min, the amount of coating was gradually increased as well. One more thing to see in the graph is that the amount of coating between 10 sec and 30 min is not noticeable, meaning that the coating was actually completed very rapidly within 10 seconds immediately after impregnating the electrode into the sol. In the meantime, when the coating time is over 300 minutes, the inside of the electrode pore as well as the outside of the electrode were coated. That is to say, if the coating process maintain for longer than 300 minutes, not only the desired inside of the electrode pore but also the outer surface area of the electrode, which is not really supposed to be coated, was coated by the sol. To be short, the desirable coating time is less than 1 minute in order to prevent the outer surface area of the electrode from being unexpectedly coated, and not to spend too much time on coating.

EXPERIMENTAL EXAMPLE 2

Determination of Appropriate Coating Cycle

The following experiment was conducted to find out how many times of coating cycle should be done to get the most effective outcomes for the present invention.

Figure 4:
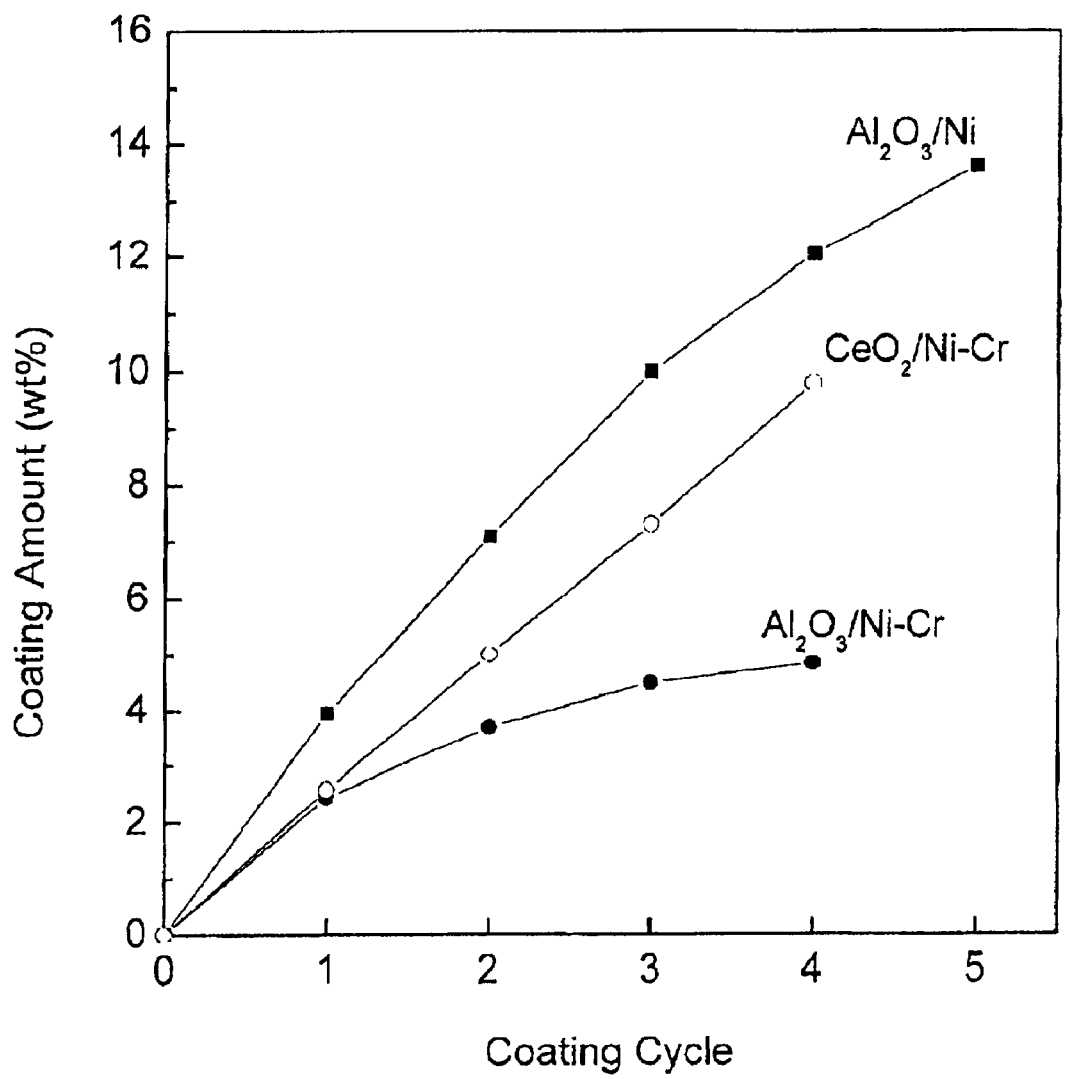
FIG. 4 is a graph illustrating changes of an amount of coating relative to coating cycle.

First of all, the coating process was repeatedly done 1, 2, 3, 4 and 5 times, respectively for the procedure of the EXAMPLE 1 ($Al_2O_3$/Ni) and the EXAMPLE 2 ($CeO_2$/Ni—Cr and $Al_2O_3$/Ni—Cr), respectively, and then the amount of coating against the respective anodes manufactured as above was measured. The results are manifested in FIG. 4. As shown in FIG. 4, as the coating cycle increases, the amount of coating was also increased. For instance, in case of the EXAMPLE 1, when the coating process was repeated five times, 14% of the anode was coated. However, the increasing rate of the amount of coating somewhat slows down when the coating process is repeatedly done. On the other hand, in case of using $Al_2O_3$/Ni—Cr as in the EXAMPLE 2, the amount of coating was hardly increased after two times of the coating process (approximately, 4% by weight of coating), and after three times of the coating process, even the undesired surface coating was done. It is known that the outer surfaces are coated because the pore-size of the Ni—Cr anode is at most ¼ to ⅓ of that of the Ni cathode, and had a low porosity. In the meantime, in case of using $CeO_2$/Ni—Cr, the amount of coating was increased almost linearly to the coating cycle. For example, when the coating was done four times, as much as 10% or more and above amount of coating was obtained. It is known that the different results are obtained in two cases because the size of $CeO_2$ sol particulates is about 10 to 20 nm, which is far smaller than that of $Al_2O_3$ sol.

EXPERIMENTAL EXAMPLE 3

Observation Through Scanning Electron Microscope

The inventors used a Scanning Electron Microscope (SEM) in order to observe the microstructure, particularly the coating layers, of the anode according to the present invention.

Figure 5:
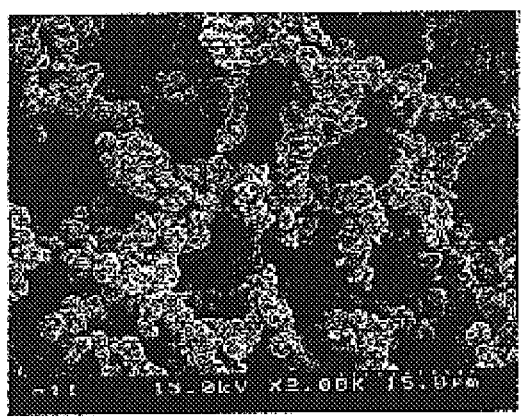
FIG. 5 is a fracture surface view of a nickel electrode coated by $Al_2O_3$ sol, taken by a Scanning Electron Microscope.
Figure 5:
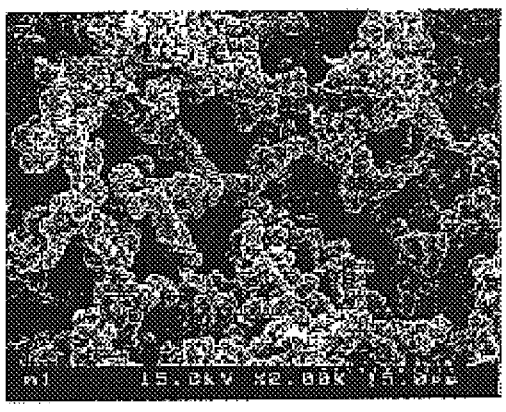
Figure 5:
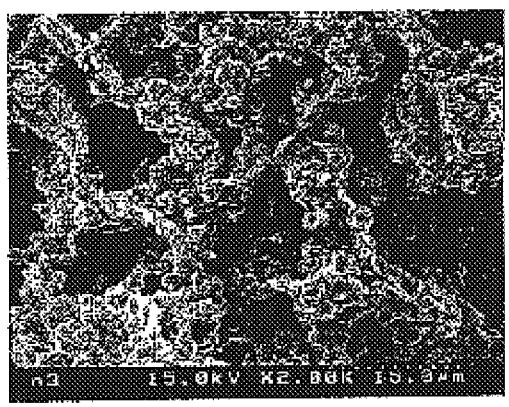
Figure 5:
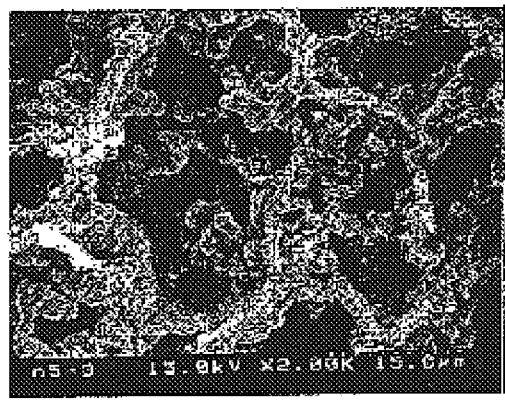

For a better observation of the microstructure of the fracture surface of the anodes manufactured according to the present invention, several different conditions were applied. Namely, based on the procedure of the EXAMPLE 1, the sol coating was conducted using 0 wt % of the amount of coating and the heat treatment at a temperature of 700° C. (refer to FIG. 5a), 4 wt % of the amount of coating and the heat treatment at a temperature of 1000° C. (refer to FIG. 5b), 7 wt % of the amount of coating and the heat treatment at a temperature of 1000° C. (refer to FIG. 5c), and 12 wt % of the amount of coating and the heat treatment at a temperature of 1000° C. (refer to FIG. 5d), respectively.

The fracture surface views of the microstructures observed using the Scanning Electron Microscope are shown in FIGS. 5a through 5d. As shown in the Figs, when the amount of coating was about 4% by weight (FIG. 5b), it was rather difficult to see the coating layer. However, once the amount of coating exceeds 7% by weight (FIGS. 5c and 5d), the coating layer surrounding the Ni particles was seen more clearly.

Figure 6:
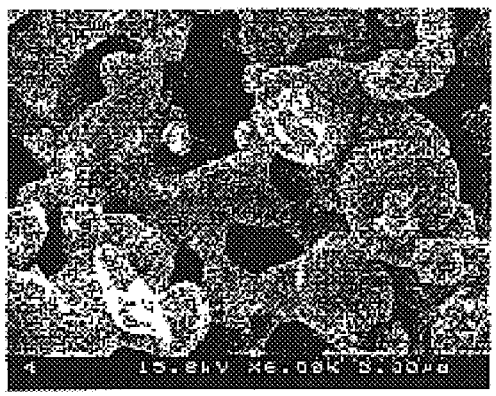
FIG. 6 is a fracture surface view of a Ni—Cr anode coated by a sol, taken by a Scanning Electron Microscope.
Figure 6:
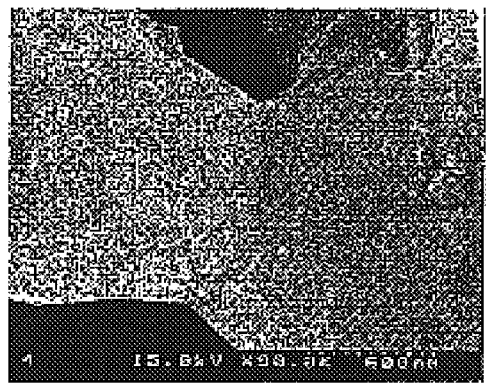
Figure 6:
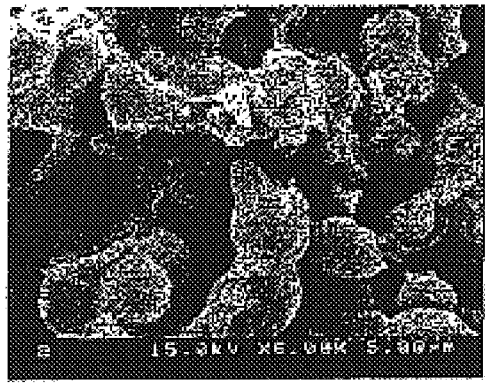
Figure 6:
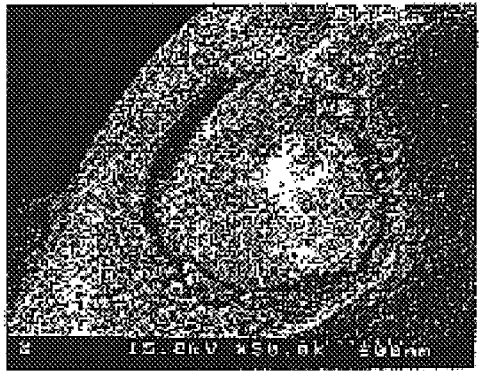
Figure 6:
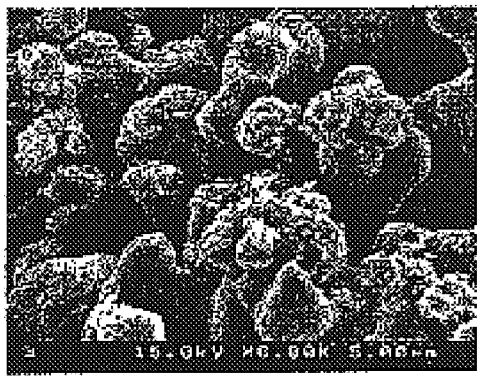
Figure 6:
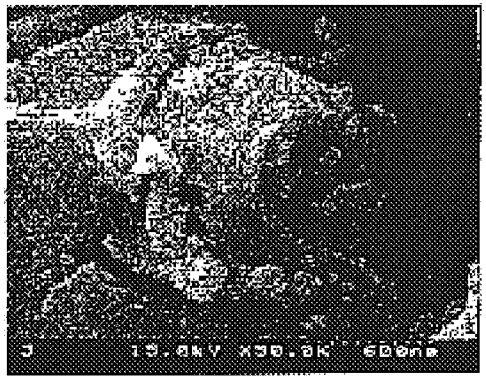

In addition, FIG. 6 illustrates the fracture surface view of the Ni—Cr anode, taken by the Scanning Electron Microscope. Specifically, FIG. 6a and FIG. 6b illustrate the fracture surface view of the non-coated anode, FIG. 6c and FIG. 6d illustrate the fracture surface view of the anode coated by $Al_2O_3$ sol up to 4 wt %, and finally, FIG. 6e and FIG. 6f illustrate the fracture surface view of the anode coated by $CeO_2$ sol up to 5 wt %. As shown in the Figures, the surface of the non-coated anodes of FIG. 6a and FIG. 6b is very smooth. In contrast, the coated anodes of FIGS. 6c through 6f are formed of the coating layer at a thickness of more than 100 nm and above, and nearly most of the surface pores are coated by the sol.

EXPERIMENTAL EXAMPLE 4

Measurement of Wettability and Amount of Impregnated Electrolyte

The degree of wettability of each anode manufactured by the above described examples was measured.

Figure 7:
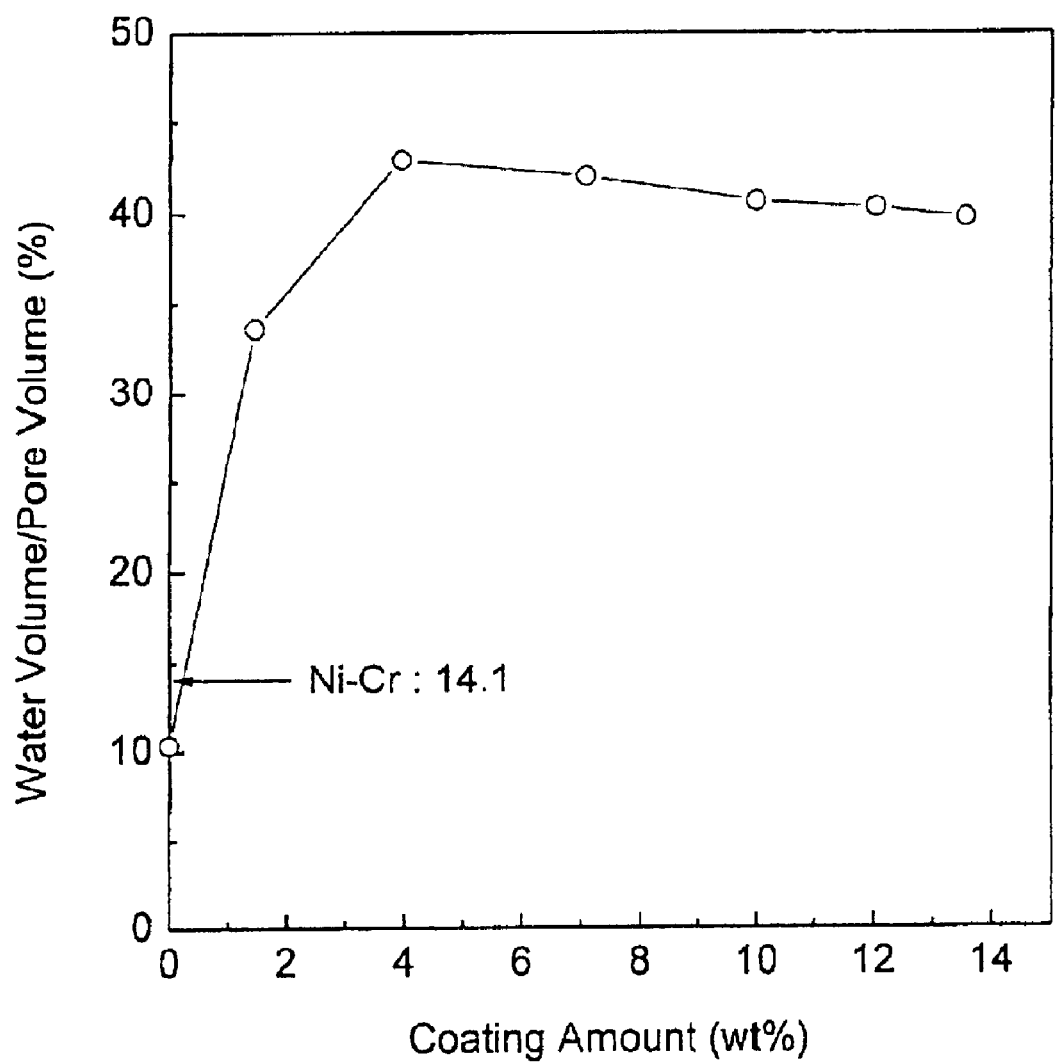
FIG. 7 is a graph illustrating changes of an amount of impregnated water in the nickel electrode relative to the amount of coating.

First of all, each anode was soaked into distilled water at room temperature for 1 minute, and then was taken out of the water for measuring any increase in weight. The increase in weight was converted to volume, and divided by a pore volume of the anode (i.e, the volume of impregnated water/the pore volume×100(%)). Since the calculation indicates the ratio of the volume of impregnated water out of the pore volume of the anode, it is a critical measure for wettability of the anode against water. The result is shown in FIG. 7. As shown in FIG. 7, the non-coated pure Ni and Ni—Cr exhibited only 10 and 14% of wettability, while the Ni electrode (Ex. I) coated by no less than 4 wt % of $Al_2O_3$ exhibited higher than 40% of wettability, which is 3 times higher than the previous wettability. Especially, the wettability was the highest when the amount of coating reached 4 wt %, but the degree of wettability was rather declined when the amount of coating was greater than 4 wt %. In result, it was known that the wettability of the anode against water was remarkably improved when the anode was coated by $Al_2O_3$ sol, and was the highest when the amount of coating was 4 wt %.

Further, the wettability and the impregnation amount of the anodes manufactured by the above EXAMPLE 2 and EXAMPLE 3 were analyzed during an actual operation of each anode on a MCFC unit cell. For the subject experiment, only half of the Ni—Cr electrode was coated by $Al_2O_3$ (4 wt %), and the performances of the MCFC unit cell (Cell No.: TW153) were measured. Then, the cell was disassembled in order to compare the amount of impregnated electrolyte in the coated portion and the non-coated portion. The MCFC unit cell was installed under the conditions shown in Table 1 as follows;

TABLE 1

| | Material | Pore-Size ($\mu$m) | Porosity (%) | Electrolyte / Matrix (wt %) Normal | Electrolyte / Matrix (wt %) Flooding |
|---|---|---|---|---|---|
| Cathode | Lithiated NiO | 8~9 | 75~80 | 130~135 | 140~150 |
| Electrolyte | 70 $Li_2CO_3$: 30 $K_2CO_3$ mol % | — | — | | |
| Matrix | $\gamma$-$LiAlO_2$ | 0.2~0.25 | 55~60 | | |
| Anode | Ni + 10% Cr | 3 | 55~60 | | |

In result of the measurements on the wettability of the anodes manufactured in EXAMPLE 2 and EXAMPLE 3, the initial performance of the installed cell was rather low, such as, 0.75V at 150 mA/$cm^2$. However, about 100 hours later, the cell performance was increased to 0.82V, and the internal resistance (IR) of the cell was decreased from 7 m$\Omega$ to 3 m$\Omega$. From the measurement, it was known that after 100 hours from the installation of the anode, there was little difference in terms of performances between the conventional Ni—Cr electrode without coating and the Ni—Cr electrode coated in accordance with the present invention.

Next, the amount of impregnated electrolyte was measured after the unit cell of each anode manufactured in the EXAMPLE 2 and EXAMPLE 3 was disassembled. The results are illustrated in Table 2 as follows:

TABLE 2

| Anode | Cell Number | Anode Coating Method | Amount of Electrolyte Injection (Vol %)* | Amount of Impregnated Electrolyte Anode Wt %** | Amount of Impregnated Electrolyte Anode Vol % | Amount of Impregnated Electrolyte Cathode Wt % | Amount of Impregnated Electrolyte Cathode Vol % |
|---|---|---|---|---|---|---|---|
| Ni—Cr | TW153 | 4%-$Al_2O_3$ | | | | | |
| | | Non-Coated Portion | 47 | 4.5~5.0 | 20~23 | 15.7 | 36 |
| | | Coated Portion | | 10.4~12.1 | 50~62 | | |
| | FL312 | Non-coated (Comparative Example) | 60 | 6.4 | 29 | 42.4 | 98 |
| | FL313 | 4%-$Al_2O_3$ (EX. 2) | 60 | 17.1 | 81 | 13.6 | 30 |
| | FL314 | 5%-$CeO_2$ (EX. 2) | 60 | 21.7 | 97 | 14.9 | 35 |
| Ni—Al | — | Non-coated (Comparative Example) | 45 | | 20 | | |
| | — | 3%-$Al_2O_3$ (EX. 3) | 45 | | 47 | | |

*A percentage of the volume of the electrolyte out of the volume of the pores of the electrode at a temperature 650° C.
**A percentage of the weight of electrolyte out of total weight of the electrode As shown in Table 2, the volume of the impregnated electrolyte of the non-coated portion of the electrode was only 20 to 23% (i.e., 4,5 to 5.0 wt %) of the volume of the electrode pores. On the other hand, the volume of the impregnated electrolyte of the electrode coated by 4 wt % $Al_2O_3$ was 50 to 62% (i.e., 10.4 to 12.1 wt %), which is up to 3 times to the most of that of the non-coated portion. The measurement result again confirmed that when the ceramic material having comparatively more excellent wettability than other metals coats the inside of the porous anode, it lowers the contact angle ($\theta$) of the electrolyte to the surface area of the anode, thereby improving the wettability of the electrolyte in result. Moreover, in case of the EX. 2 and EX. 3, the amount of the impregnated electrolyte was noticeably increased compared with the non-coated electrodes (indicated as Comparative Examples).

EXPERIMENTAL EXAMPLE 5

Measurement of Amount of Impregnated Electrolyte of Anode Under Flooding Condition In order to apply the coated anode to an actual MCFC, the cell should maintain excellent stability and performance at any time, even under the flooding condition where the electrolyte injection amount is more than usual. As aforementioned, the term "flooding" is herein referred to that diffusion resistance through the electrolyte occurs when the electrolyte injection amount is more than usual, or excessive, so the electrolytic film formed on the electrode's pores, particularly on the surface area of the cathode's pores, gets thicker. In addition, the term "flooding" herein includes that the formation of three-phase boundary area of the electrolyte-the electrode-reactant gas is interrupted. In general, the flooding occurs only when the volume of the injected electrolyte is greater than about 45% of total volume of the electrode pores at the temperature of 650° C. The cases of the FL312, FL313 and FL314 illustrated in Table 2 satisfy a flooding condition, since the volume of the injected electrolyte amounts is 60 vol %. After 100-hour of operation of the cell under the above flooding conditions, the cell was disassembled and the amount of the impregnated electrolyte was analyzed. As shown in Table 2, it was observed how the flooding influences the non-coated anodes (indicated as 'Non-coated portion' of TW153, and FL312). As the result, it was known that if the injection amount of electrolyte was increased, i.e., from 47 vol % (the non-coated portion of TW153) to 60 vol % (FL312), the total amount of the impregnated electrolyte in the anode showed little difference (20~23→29 vol %), but the pores of the cathode were filled with a large amount of the electrolyte (36→98 vol %) instead. On the contrary, the influence of the flooding on the anodes coated by $Al_2O_3$ or $CeO_2$ sol (indicated as 'Coated portion' of TW153, FL313, and FL314) was quite different from the above. In other words, when the injection amount of electrolyte was increased from 47(the coated portion of TW153) to 60 vol % (FL313 and FL314), the amount of the impregnated electrolyte inside of the anode was hardly changed (36→30 or 35 vol %), but the anodes were filled with a large amount of the electrolyte (50~62→81 or 97 vol %), of greater than 80 vol %. Therefore, if the coated anode in accordance with the present invention is used, the excessive amount of the electrolyte is not impregnated into the cathode under the flooding condition, and at the same time, the electrolyte goes to the anode to fill it Up.

EXPERIMENTAL EXAMPLE 6

Figure 8:
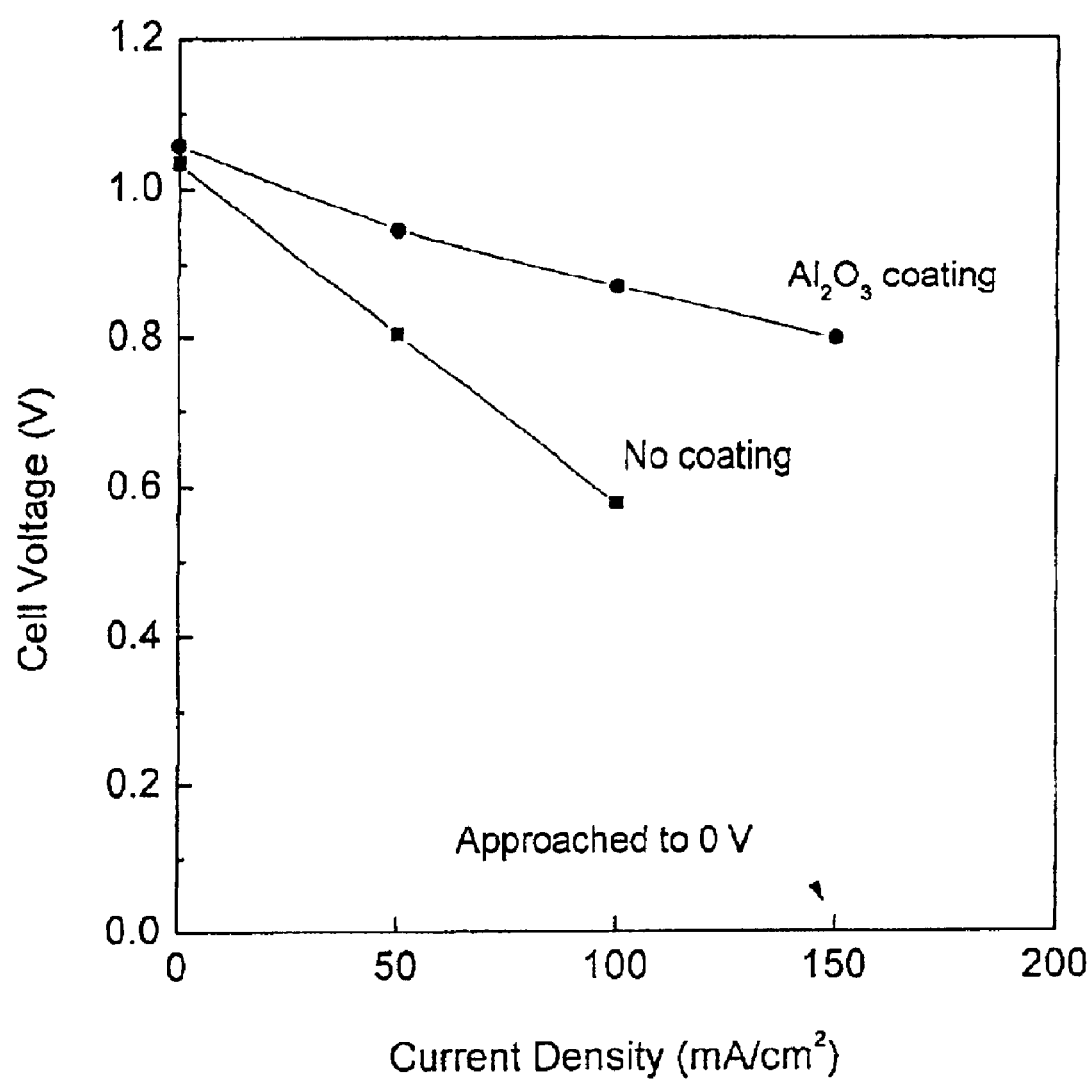
FIG. 8 is a graph comparing a conventional Ni—Cr anode that is not coated with a Ni—Cr anode coated by $Al_2O_3$ sol according to the present invention in view of the performance of a unit cell under a flooding condition.

Analysis on Performances of MCFC with Coated Anode of Present Invention Under Flooding Condition The performances of the MCFC with the coated anode according to the present invention under the flooding condition were analyzed. For the experiment, MCFC installing the non-coated Ni—Cr anode (Comparative Example) was compared with MCFC installing the Ni—Cr anode coated by 4 wt % $Al_2O_3$ (EX. 2) in the performances at a temperature of 650° C. The analysis result is shown in FIG. 8. As shown in FIG. 8, when an excessive amount of electrolyte was injected to the conventional non-coated anode (Comparative Example), the capacity of the cell was barely apparent at 150 mA/cm² of current density due to the flooding phenomenon. However, when the coated anode according to the present invention was used, the performance of the MCFC was approximately 0.8 V at 150 mA/cm² of current density.

Figure 9:
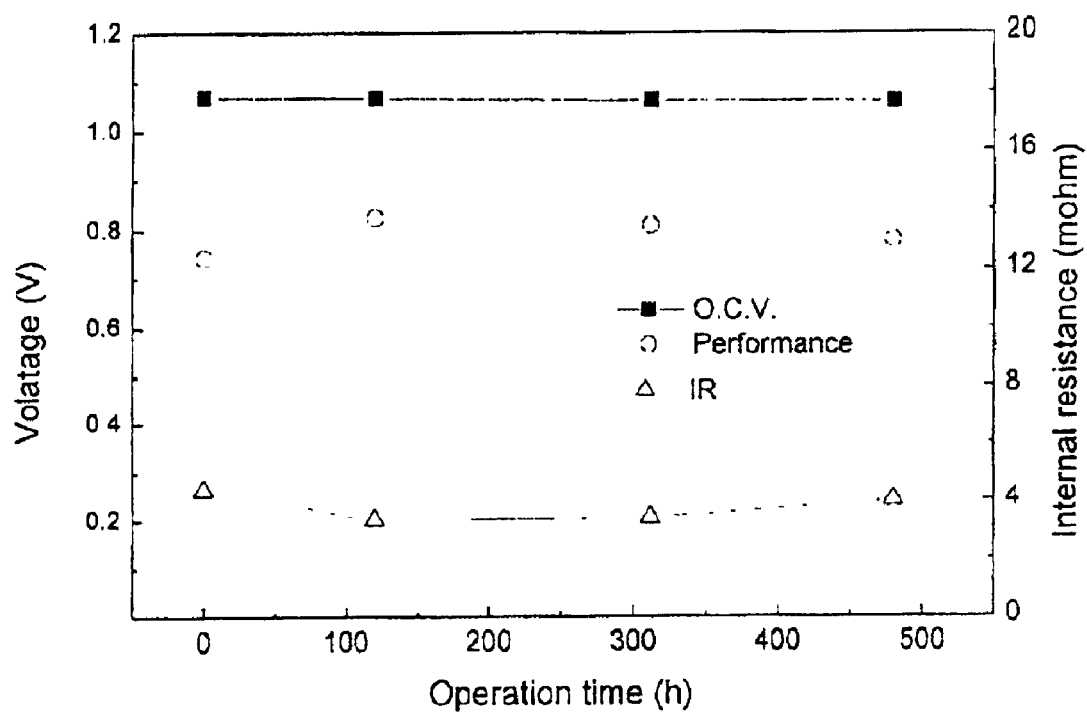
FIG. 9 is a graph illustrating performances of a unit cell of the Ni—Cr anode coated by $Al_2O_3$ sol according to the present invention under the flooding condition during long periods of operation.

Furthermore, when the cell equipped with the Ni—Cr anode coated by 4 wt % $Al_2O_3$ (EX.2) under the above flooding condition was operated during an extended period of time, as shown in FIG. 9, the cell successfully maintained its high stability regardless of the long periods of operation. Automatically, since the electrolyte accumulated in the anode was stably maintained, the cell's performances during a long period were also greatly improved.

Based on the Experimental Examples 5 and 6, it is known that under the flooding condition, in case of the conventional and general MCFC, the electrolyte fills the cathode first since the cathode has superior wettability to that of the anode. However, in case of the MCFC with the coated anode in accordance with the present invention, the pore-size of the anode is comparatively small to that of the cathode and the wettability of the anode is increased, so that the anode can absorb a greater amount of electrolyte, preventing the flooding occurrence. At this time, the coated anode in the MCFC plays an important role as a reservoir of the electrolyte for supplementing the electrolyte loss in any case.

In conclusion, using the coated anode for the MCFC or the MCFC including the same in accordance with the present invention, the wettability of the anode to the molten carbonate used as the electrolyte for the MCFC and the amount of impregnated electrolyte are greatly improved. Therefore, even when an excessive amount of the electrolyte might be supplied to the cell, the present invention can prevent the flooding occurrence in the cathode, and prevents the electrolyte loss, which is usually caused by the evaporation and corrosion of the molten carbonate during the long periods of operation of the MCFC, and the resultant deterioration of the cell performance. Also, unlike the conventional cell, the present invention can maintain the microstructure thereof since does not require necessarily changing the pore-size of the anode, thereby successfully preventing the gas diffusion resistance of the anode. To be short, the present invention is very useful in viewpoint that it can prevent any electrolyte loss that is often observed in the long periods of operation of the MCFC, and maintain a high stability of the cell for an extended period of time, compared with the conventional cell. Also, the present invention itself is applicable to an electrode made of Ni-based alloys or metal compounds, which is expected to be competent MCFC materials nowadays, as well as the electrode made of Ni, Ni—Cr and Ni—Al alloy used in the present invention. Thus, irrespective of the material of an anode, the anode's performance during a long time can be improved.

Furthermore, the present invention is highly applicable to all kinds of fields as long as the porous structure is needed, especially, when the surface area of the pores of the porous structure undergoes a specific reaction or its physical/chemical properties should be changed. Besides the sols used in the present invention, any type of sols suitable for the invention (satisfying several conditions, e.g., particulate sol, polymerized sol, kind of the solvent, size or kind of the particle etc.) can be used as well. On the top of the materialistic advantage aforementioned, the present invention is very useful since the coating process itself is very simple and can be carried out at low cost without using expensive equipments and high temperature. Lastly, the present invention is widely applicable to a variety of fields, including a large area.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Molten Carbonate Fuel Cell (MCFC) comprising an anode having pores and a cathode having pores, wherein, of the surfaces of the pores of the anode and the surfaces of the pores of the cathode, the surfaces of the pores of the anode only are coated with a porous ceramic film.

2. The Molten Carbonate Fuel Cell according to claim 1, wherein the anode material is selected from a group consisting of pure nickel (Ni), metallic mixtures containing Ni, alloys containing Ni, or metallic compounds containing Ni.

3. The Molten Carbonate Fuel Cell according to claim 1, wherein the porous ceramic film is selected from a group consisting of aluminum oxide sol, cerium oxide sol, zirconium oxide sol, aluminum hydroxide sol, cerium hydroxide sol and zirconium hydroxide sol.

4. The Molten Carbonate Fuel Cell according to claim 1, wherein the porous ceramic film is formed through a sol-gel process, in which the anode is dipped into a ceramic sol and is dried.

5. The Molten Carbonate Fuel Cell according to claim 4, wherein the coating process is carried out for less than 1 minute.

6. The Molten Carbonate Fuel Cell according to claim 4, wherein the coating process is repeated more than once.

7. The Molten Carbonate Fuel Cell according to claim 6, wherein the coating process is repeated twice.

8. The Molten Carbonate Fuel Cell according to claim 4, wherein an amount of the coating is in a range of from 4 to 5% by weight based on a total weight of the anode.

9. An anode for a Molten Carbonate Fuel Cell (MCFC) having pores coated with a porous ceramic film form a material selected from the group consisting of aluminum oxide sol, cerium oxide sol, zirconium oxide sol, aluminum hydroxide sol, cerium hydroxide sol and zirconium hydroxide sol, said porous ceramic film being the product of a sol gel process in which the anode is dipped into a ceramic sol and is dried, the coating process being carried out for less than 1 minute and being repeated more than once, said porous creamic coating being present in an amount in the range of from 4 to 5% by weight based on the total weight of the anode.

* * * * *